United States Patent
Kato (10) Patent No.: US 10,867,750 B2
(45) Date of Patent: Dec. 15, 2020

(54) DIELECTRIC FILM, FILM CAPACITOR AND COMBINATION TYPE CAPACITOR USING SAME, INVERTER, AND ELECTRIC VEHICLE

(71) Applicant: KYOCERA Corporation, Kyoto (JP)

(72) Inventor: Wataru Kato, Daito (JP)

(73) Assignee: KYOCERA CORPORATION, Kyoto (JP)

( * ) Notice: Subject to any disclaimer, the term of this patent is extended or adjusted under 35 U.S.C. 154(b) by 52 days.

(21) Appl. No.: 15/535,636

(22) PCT Filed: Dec. 21, 2015

(86) PCT No.: PCT/JP2015/085626
§ 371 (c)(1),
(2) Date: Jun. 13, 2017

(87) PCT Pub. No.: WO2016/104398
PCT Pub. Date: Jun. 30, 2016

(65) Prior Publication Data
US 2017/0352480 A1 Dec. 7, 2017

(30) Foreign Application Priority Data

Dec. 24, 2014 (JP) .................................. 2014-260672
Jan. 27, 2015 (JP) .................................. 2015-013414

(51) Int. Cl.
*H01G 4/18* (2006.01)
*H01G 4/38* (2006.01)
(Continued)

(52) U.S. Cl.
CPC .................. *H01G 4/18* (2013.01); *B60L 9/18* (2013.01); *B60L 50/60* (2019.02); *C08J 5/18* (2013.01);
(Continued)

(58) Field of Classification Search
CPC ............ H01G 4/18; H01G 4/206; H01G 4/32; H01G 4/33; H01G 4/38; C08J 5/18;
(Continued)

(56) References Cited

U.S. PATENT DOCUMENTS 4,115,371 A * 9/1978 Bier ......................... C08K 3/32
524/605
5,264,247 A 11/1993 Lintula
(Continued)

FOREIGN PATENT DOCUMENTS

CN 102598895 A 7/2012
CN 103563012 A 2/2014
(Continued)

OTHER PUBLICATIONS

English-language machine translation of JP-2000143787-A; conducted on Espacenet on Feb. 12, 2019.*
(Continued)

*Primary Examiner* — Nicholas E Hill
(74) *Attorney, Agent, or Firm* — Volpe Koenig (57) ABSTRACT

There are provided a dielectric film which is excellent in heat resistance and is capable of improvement in breakdown field, a film capacitor and a combination type capacitor using the dielectric film, an inverter, and an electric vehicle. A film capacitor having excellent heat resistance and high breakdown field is obtained by producing a film capacitor that uses a dielectric film comprising an organic resin and a plurality of fine particles containing a metal element, an average of diameters of the fine particles falling in a range of 0.5 nm to 50 nm. Such a film capacitor and a combination type capacitor connected thereto via a bus bar are preferably used in an inverter and an electric vehicle.

12 Claims, 6 Drawing Sheets

(51) Int. Cl.
  H02M 7/48      (2007.01)
  C08K 5/057     (2006.01)
  C08J 5/18      (2006.01)
  C08L 67/00     (2006.01)
  B60L 9/18      (2006.01)
  H01G 4/32      (2006.01)
  H01G 4/20      (2006.01)
  B60L 50/60     (2019.01)
  H01G 4/33      (2006.01)
  H02M 7/5387    (2007.01)

(52) U.S. Cl.
  CPC .............. *C08K 5/057* (2013.01); *C08L 67/00* (2013.01); *H01G 4/206* (2013.01); *H01G 4/32* (2013.01); *H01G 4/33* (2013.01); *H01G 4/38* (2013.01); *H02M 7/48* (2013.01); *H02M 7/5387* (2013.01); *B60L 2210/30* (2013.01); *Y02T 10/70* (2013.01)

(58) Field of Classification Search
  CPC ......... C08K 5/057; C08L 67/00; C08L 67/03; H02M 7/48; H02M 7/5387
  See application file for complete search history.

(56) References Cited

U.S. PATENT DOCUMENTS

| | | | |
|---|---|---|---|
| 5,595,601 A | 1/1997 | Lintula | |
| 5,726,247 A | 3/1998 | Michalczyk et al. | |
| 6,103,854 A | 8/2000 | Arakawa et al. | |
| 7,046,439 B2* | 5/2006 | Kaminsky | G02B 1/041 359/452 |
| 7,109,274 B2* | 9/2006 | Acar | C08L 67/03 525/133 |
| 9,679,699 B2* | 6/2017 | Kamigaki | C08K 3/00 |
| 10,147,542 B2* | 12/2018 | Maeda | H01G 4/18 |
| 2005/0029515 A1* | 2/2005 | Nagai | H01G 4/206 257/40 |
| 2007/0116976 A1* | 5/2007 | Tan | C08K 3/22 428/546 |
| 2010/0028566 A1* | 2/2010 | Ryu | C08L 61/28 428/1.1 |
| 2011/0046285 A1* | 2/2011 | Imai | G02B 1/10 524/413 |
| 2013/0253118 A1* | 9/2013 | Shiraishi | C08K 3/30 524/423 |
| 2014/0004364 A1 | 1/2014 | Takahashi et al. | |

FOREIGN PATENT DOCUMENTS

| | | | | |
|---|---|---|---|---|
| JP | 09-129475 A | | 5/1997 | |
| JP | 11-255883 A | | 9/1999 | |
| JP | 2000-500161 A | | 1/2000 | |
| JP | 2000143787 A | * | 5/2000 | |
| JP | 2001172482 A | * | 6/2001 | |
| JP | 2004-111400 A | | 4/2004 | |
| JP | 2005-056935 A | | 3/2005 | |
| JP | 2006-225484 A | | 8/2006 | |
| WO | WO-9413464 A1 | * | 6/1994 | ............ B29C 55/12 |
| WO | 2011/056455 A2 | | 5/2011 | |
| WO | 2013/058237 A1 | | 8/2013 | |

OTHER PUBLICATIONS

English-language abstract of JP-2001172482-A; obtained from Espacenet on Feb. 12, 2019.*

English language machine translation of JP-2000143787-A, conducted on Espacenet May 15, 2020.*

Fabio Garbassi & Riccardo Po, "Engineering Thermoplastics," in 10 Kirk Othmer Encyclopedia of Chemical Technology 168 (2001).*

Lifen Tong et al., "Effect of Nanosilica on the Thermal, Mechanical, and Dielectric Properties of Polyarylene Ether NItrifies Terminated with Phthalonitrile," 35 Polymer Composites 344 (2014), first published Sep. 25, 2013.*

International Search Report, PCT/JP2015/085626, dated Mar. 15, 2016, 2 pgs.

* cited by examiner

DIELECTRIC FILM, FILM CAPACITOR AND COMBINATION TYPE CAPACITOR USING SAME, INVERTER, AND ELECTRIC VEHICLE

TECHNICAL FIELD

The present invention relates to a dielectric film, a film capacitor and a combination type capacitor using the dielectric film, an inverter, and an electric vehicle.

BACKGROUND ART

For example, a film capacitor is constituted by a dielectric film of polypropylene resin in film-like form having a vapor-deposited metallic membrane on a surface thereof as an electrode. With this construction, even if electrical short-circuiting occurs in an insulation defective area of the dielectric film, the metallic membrane located around the defective area is vaporized for release under short-circuiting-induced energy, which leads to electrical isolation. This construction has thus an advantage in its capability of protecting the film capacitor against dielectric breakdown (for example, refer to Patent Literature 1).

That is, the film capacitor is capable of preventing ignition and electric shock entailed by electrical short-circuiting in an electric circuit. The film capacitor, being noteworthy for such an advantage, has been recently put to an increasingly wider range of uses, including application to a power circuit of LED (Light Emitting Diode) illumination.

However, on a substrate on which various electronic components are mounted, the film capacitor is still made of large size as compared with other electronic component such as a ceramic capacitor, and inconveniently its placement may constitute an impediment to accomplishment of low-profile design and higher packaging density of the substrate. Consequently, studies have been carried out on development of a smaller version of the film capacitor. Moreover, for example, as a result of miniaturization of electronic equipment and capacity increases in capacitors, electronic components have come to be used in higher-temperature environments. These electronic components are thus required to be resistant to heat so as to provide stable electrical characteristics for a long period of time even under high-temperature environments.

Reduction in the layer thickness of the dielectric film, and reduction in the number of layers or turns of the dielectric film can be given by way of examples of means for making the film capacitor smaller in size. The reduction of the layer thickness of the dielectric film cannot be achieved without enhancement of the dielectric strength of the dielectric film. For example, Patent Literature 2 suggests application of a composite dielectric material made of an epoxy group-bearing organic resin containing dispersed ceramic particles to the dielectric film in the interest of dielectric strength enhancement.

Moreover, for example, Patent Literature 3 suggests, as a material having excellent heat resistance, an organic-inorganic hybrid polymeric material obtained by introducing metal alkoxide into a polyarylate-based material.

CITATION LIST

Patent Literature

Patent Literature 1: Japanese Unexamined Patent Publication JP-A 9-129475 (1997)

Patent Literature 2: Japanese Unexamined Patent Publication JP-A 2006-225484

Patent Literature 3: Japanese Unexamined Patent Publication JP-A 11-255883 (1999)

SUMMARY OF INVENTION

Technical Problem

However, in the dielectric film as disclosed in Patent Literature 2, the heat resistance is not sufficient, and, at an interface between the organic resin and the ceramic particle, there arises an increase in electric field intensity at the organic resin side. This presents the problem of a decrease in dielectric strength in the dielectric film as a whole. Furthermore, the material as disclosed in Patent Literature 3, while having excellent heat resistance, exhibits a maximum dielectric strength (breakdown field) of only about 330 V/μm. This presents the problem of insufficient dielectric strength to achieve reduction in the layer thickness of the dielectric film.

The invention has been devised to solve the problems as discussed supra, and accordingly an object of the invention is to provide a dielectric film capable of improvement in breakdown field, a film capacitor and a combination type capacitor using the dielectric film, an inverter, and an electric vehicle.

Solution to Problem

A dielectric film according to one embodiment of the invention comprises an organic resin and a plurality of fine particles containing a metal element, and an average of diameters of the fine particles falls in a range of 0.5 nm to 50 nm.

A film capacitor according to one embodiment of the invention comprises a main body composed of a roll or laminate of metallized films each comprising the above-described dielectric film and a metallic membrane disposed thereon; and an external electrode disposed on the main body.

A combination type capacitor according to one embodiment of the invention comprises bus bars and a plurality of the above-described film capacitors connected to each other via the bus bars.

An inverter according to one embodiment of the invention comprises a bridge circuit constituted by switching elements, and a capacitance section connected to the bridge circuit, the capacitance section being the above-described film capacitor or combination type capacitor.

An electric vehicle according to one embodiment of the invention comprises a power supply, an inverter connected to the power supply, a motor connected to the inverter, and wheels driven by the motor, the inverter including the above-described inverter.

Advantageous Effects of Invention

The invention provides a dielectric film capable of improvement in breakdown field, a film capacitor and a combination type capacitor using the dielectric film, an inverter, and an electric vehicle.

DESCRIPTION OF EMBODIMENTS

A dielectric film according to the present embodiment comprises an organic resin and a plurality of fine particles containing a metal element, and an average of diameters of the fine particles falls in a range of 0.5 nm to 50 nm.

The dielectric film according to the present embodiment contains a metal element, and, the content of the metal element preferably falls in a range of 0.05% to 5.0% by mass, more preferably in a range of 0.1% to 4.0% by mass, or particularly in a range of 0.2% to 3.0% by mass. The metal element is included in the fine particle lying between molecules of the organic resin.

Figure 1:
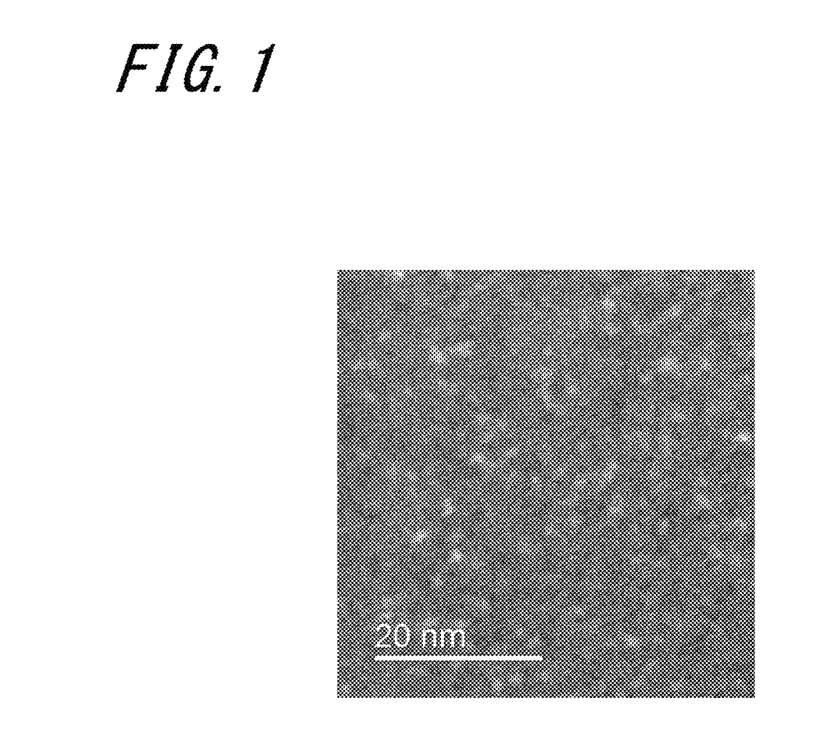
FIG. 1 is a transmission electron microscope (TEM) photograph of a dielectric film according to the present embodiment.

In this embodiment, the fine particle containing the metal element refers to a group of a plurality of metal elements in proximity to one another in a minute region. That is, in the section of the dielectric film, as shown in FIG. 1, metal elements which look white as observed under a transmission electron microscope (TEM) apparently gather in proximity to one another within a range which measures several nanometers across, for example. In other words, the fine particle containing the metal element is a minute region with a group of a plurality of metal elements in particle form. Moreover, the fine particle containing the metal element may also be defined as a plurality of metal elements in a minute cluster.

Thus, the dielectric film of this embodiment contains the fine particle in the form of a cluster of a plurality of metal elements which look white in the TEM photograph in proximity to one another in a region which measures 0.5 to 50 nm across, and, a plurality of the fine particles are dispersed in the organic resin. In what follows, such a fine particle containing the metal element will be referred to as a metal element-containing fine particle.

The presence of the metal element-containing fine particle can be checked by observation of the section of the dielectric film under a transmission electron microscope (TEM) as described above. The thereby constructed dielectric film can be suitably used as a thin-layer dielectric film having an average layer thickness of 5 μm or less, or, in particular, an average layer thickness of 1 μm to 5 μm.

It is heretofore known that, by dispersing fillers of metal element-containing inorganic compound particles in an organic resin, it is possible to trap electric charges moving in the organic resin in the inorganic compound particle, and thereby obtain the effect of suppressing local electric-field concentration. Under normal circumstances, fillers of inorganic compound particles ranging in average particle size from about a few dozen to a few hundred nanometers are mixed in a dispersed state in an organic resin. In such a configuration, a metal element contained in the inorganic compound particle is presumably conducive to the trapping of electric charges.

In this embodiment, it may be considered that the fine particle containing the metal element (metal element-containing fine particle) traps electric charges moving in the organic resin for suppression of local electric-field concentration. While the metal element-containing fine particle may be made of an inorganic compound containing a metal element, preferably it is made of an organic compound containing a metal element or a metal element-containing mixture of an inorganic compound and an organic compound. The use of an organic compound containing a metal element or a metal element-containing mixture of an inorganic compound and an organic compound for the metal element-containing fine particle makes it possible to disperse metal elements in the form of more minute clusters in the organic resin, and thereby enhance the effect of suppressing local electric-field concentration. The average of the diameters of the metal element-containing fine particles preferably falls in a range of 0.5 nm to 50 nm, more preferably in a range of 0.5 nm to 10 nm, or particularly in a range of 1 nm to 3 nm. For example, the average of the diameters of the metal element-containing fine particles can be determined by analyzing profile data obtained by measurement using Small Angle X-ray Scattering Method.

Presumably the fact that the metal element-containing fine particle takes the form of a cluster of a plurality of metal elements in proximity to one another in a minute region may account for the expression of the effect of suppressing local electric-field concentration. For example, in the dielectric film, the condition where a plurality of metal elements gather in proximity to one another in a minute region cannot be achieved merely by introducing a metal element into the main backbone of the organic resin, expressed differently, merely by causing crosslinking of the main backbone of the organic resin with metal alkoxide. This leads to difficulties in attainment of insulation improvement effect. In this regard, as practiced in this embodiment, where the metal element-containing fine particles, each in the form of a cluster of a plurality of metal elements in proximity to one another in a minute region, are present in a dispersed state in the dielectric film, not only further improvement in breakdown field in the dielectric film, but also an increase in lifetime under a high temperature load can be achieved.

In the dielectric film, the volume percentage of such fine particles containing the metal element (metal element-containing fine particles) contained therein preferably falls in a range of 0.4% to 40% by volume, more preferably in a range of 2% to 20% by volume, or particularly in a range of 5% to 18% by volume. For example, the volume percentage of the fine particles containing the metal element (metal element-containing fine particles) contained in the dielectric film can be determined by analyzing profile data obtained by measurement using Small Angle X-ray Scattering Method.

Examples of the metal element contained in the dielectric film include Si, Ti, Zr, Fe, Cu, Sn, Al, Ge, Ta, and W. In particular, at least one element selected from the metal element group consisting of Si, Ti, Zr, and Al is desirable. This is because the use of metal alkoxide in this metal element group facilitates formation of the metal element-containing fine particle in the organic resin.

The metal element contained in the dielectric film is not limited to one element, and two or more elements may therefore be contained therein. For example, the type and content of the metal element contained in the dielectric film can be determined by high-frequency inductively coupled plasma (ICP) emission spectrometry.

It is preferable to use a resin material having excellent heat resistance, such as polycarbonate (PC), polyarylate (PAR), polyphenylene ether (PPE), cyclic olefin (COP)-based resin, or polyetherimide (PEI)-based resin, as the organic resin. The use of such a highly heat-resistant resin material makes it possible to form a dielectric film having excellent heat resistance. Note that the resin material group consisting of polycarbonate, polyarylate, polyphenylene ether, cyclic olefin-based resin, and polyetherimide-based resin is desirable for use from the standpoints of solubility in an organic solvent and easiness in mixture with metal alkoxide.

It is preferable that the organic resin constituting the dielectric film of this embodiment contains, as a major constituent, a resin material which has polyester as main backbone and has an alkoxy group. As used herein, the major constituent refers to a component contained in an amount of greater than or equal to 50% by mass based on the dielectric film as a whole.

Examples of the resin material having polyester as main backbone include polycarbonate, polyarylate, and polymers of these substances. Polycarbonate and polyarylate are excellent in heat resistance, mechanical characteristics, and electrical characteristics (insulation properties and dielectric characteristics), and are hence suitable for use as the organic resin material for the dielectric film.

The binding of an alkoxy group to the main backbone (polyester) of such a resin material enables further improvement in breakdown field in the resin material.

In general, electrical insulation shows a correlation with the polarity of a substance. As a rule, as the polarity is lower, electrical insulation (breakdown field level) becomes higher, or equivalently, as the polarity is higher, electrical insulation (breakdown field level) becomes lower. Polycarbonate and polyarylate have a chemical structure with relatively high polarity, whereas an alkoxy group is a functional group with low polarity. Accordingly, by introducing an alkoxy group, which is a functional group with low polarity, into the molecules, in particular, the main backbone, of polycarbonate or polyarylate, it is possible to achieve improvement in breakdown field in polycarbonate or polyarylate.

In addition to polycarbonate and polyarylate, other resin material having polyester as main backbone similarly allows improvement in breakdown field so long as its main backbone (polyester) has an alkoxy group bound thereto. Moreover, the use of metal alkoxide in the earlier described metal element group facilitates addition of an alkoxy group to the main backbone of the resin material.

It is preferable that the main backbone of the resin material having polyester as main backbone and an alkoxy group are bound by ester linkages. When reaction occurs between a polymer and metal alkoxide, under normal conditions, cross-links are developed under hydrolytic degradation and polycondensation of the functional group of the polymer and metal alkoxide, thus forming an organic resin having a metal alkoxide group in its intramolecular main backbone.

Meanwhile, in this embodiment, an alkoxy group in metal alkoxide on degradation is bound to the main backbone of the resin material, and, the main backbone of the resin material is free of a metal element. Consequently, the excellent heat resistance, mechanical characteristics, and electrical characteristics of the resin material can be maintained. In this case, the main backbone of the resin material and an alkoxy group are bound by ester linkages.

The content of an alkoxy group in the organic resin preferably falls in a range of 0.05% to 11%, more preferably in a range of 0.5% to 5.0%, or particularly in a range of 1.0% to 3.5% in terms of ratio by mole based on all the ester linkages present in the organic resin. The fulfillment of such a alkoxy-group content requirement makes it possible to achieve improvement in breakdown field in the organic resin in itself while maintaining the heat resistance and the mechanical characteristics of the organic resin.

The condition of binding between the organic resin and an alkoxy group, and the content of an alkoxy group in the organic resin (the ratio by mole of the alkoxy group to all the ester linkages present in the organic resin) can be checked and determined by nuclear magnetic resonance (NMR) spectroscopy, and more specifically, $^1$H-NMR (Proton NMR) spectrometry, $^{13}$C-NMR spectrometry, and HMQC (Heteronuclear Multiple Quantum Coherence) spectrometry or HMBC (Heteronuclear Multiple Bond Connectivity) spectrometry based on Two-dimensional correlation NMR spectroscopy.

For example, the dielectric film of this embodiment can be obtained in the following manner. A resin material used for the organic resin is dissolved in an organic solvent to prepare a resin solution. Likewise, metal alkoxide is dissolved in an organic solvent to prepare a metal alkoxide solution. In an inert atmosphere, the metal alkoxide solution is blended in the resin solution so prepared, and the mixture is stirred for 24 hours or more. These process steps are performed in an inert atmosphere (dry nitrogen, for example) to initiate metal alkoxide-to-metal alkoxide condensation reaction while inhibiting hydrolytic degradation of metal alkoxide. The reaction yields fine particles containing the metal element. Thus, there is obtained a solution for dielectric film comprising the resin material and the metal element-containing fine particles.

At this time, in the case of using a polymer having polyester as main backbone such as polycarbonate or polyarylate as the resin material, metal alkoxide decomposes ester linkages in the polymer, and, an alkoxy group of metal alkoxide is bound to that part of the polymer subjected to ester linkage decomposition by addition reaction.

With use of the dielectric film solution, a dielectric film may be formed on, for example, a polyethylene terephthalate (PET)-made base. As the method of film formation, it is possible to use one film-forming technique selected from among a doctor blade method, a die coater method, and a knife coater method.

Examples of the described resin material include polymers such as polycarbonate having a repeating unit defined in the general formula (1) and polyarylate having a repeating unit defined in the general formula (2) or (3).

[Chemical Formula 1]

(1)

(2)

(3)

(4)

In the general formula (1), (2), or (3), X represents at least one divalent group selected among from a divalent aliphatic group, a divalent cycloaliphatic group, and a divalent group expressed by the general formula (4). In the general formula (3), Y represents substituted or unsubstituted arylene group.

In the general formula (4), R1 and R2 independently represent substituted or unsubstituted alkyl group, aryl group, or halogen atom. A represents single bond or 1-12C straight-chain, branched, or cyclic alkylene group.

Divalent groups expressed by the general formulae (5a) to (5n) may be given as specific examples of X in the general formulae (1), (2), and (3) described above.

[Chemical Formula 2]

(5a)

(5b)

(5c)

(5d)

(5e)

(5f)

(5g)

(5h)

(5i)

(5j)

(5k)

(5l)

(5m)

A polymer of norbornene monomer as expressed by the general formula (6) may be given as an example of cyclic olefin-based resin materials. A norbornene-based monomer is one of cyclic olefin monomers. A cyclic olefin monomer is a compound which has a cyclic structure composed of carbon atoms, and contains a carbon-carbon double bond present in the cyclic structure. In addition to norbornene-based monomers, monocyclic olefin may be given as an example of cyclic olefin monomers. For example, a norbornene-based monomer forms a cyclic olefin-based organic resin under ring-opening polymerization, vinyl copolymerization, vinyl polymerization, or radical polymerization as expressed respectively in the reaction formulae (7) to (10).

[Chemical Formula 3]

In the formulae (6) to (10), R3, R4, and R5 each represent any given functional group. Moreover, although a polymer of a single norbornene-based monomer is customarily used as a cyclic olefin-based resin material, it is possible to use a polymer of a plurality of different norbornene-based monomers.

Specific examples of norbornene-based monomers include norbornenes, dicyclopentadienes, and tetracyclododecenes. Some may contain, as a substituent group, a hydrocarbon group such as an alkyl group, an alkenyl group, an alkylidene group, or an aryl group, or a polar group such as a carboxyl group or an acid anhydride group. However, a nonpolar norbornene-based monomer, that is, a norbornene monomer composed solely of carbon atoms and hydrogen atoms is desirable.

Examples of nonpolar norbornene-based monomers include nonpolar dicyclopentadienes, nonpolar tetracyclododecenes, nonpolar norbornenes, and nonpolar cyclic olefins of pentacylic and greater polycyclic systems.

In addition to a double bond of a norbornene ring, another double bond may be included in such a norbornene-based monomer.

Specific examples of such a cyclic olefin-based resin material include commercially available norbornene-based ring-opening polymers (hereafter also referred to simply as "ring-opening polymers") such as ARTON (registered trademark) manufactured by JSR Corporation and ZEONEX (registered trademark) and ZEONOR (registered trademark) manufactured by ZEON Corporation, and commercially available norbornene-based vinyl copolymers (hereafter also referred to simply as "vinyl copolymers") such as APEL (registered trademark) and APO (registered trademark) manufactured by Mitsui Chemicals, Inc. and TOPAS (registered trademark) manufactured by Polyplastics Co., Ltd. Also, it is possible to use a hydrogen additive of a ring-opening polymer of norbornene ring-containing monomer, an addition polymer of norbornene ring-containing monomer and α-olefins, an addition polymer of cyclic olefin, a hydrogen additive of cyclic-olefin addition polymer, an addition polymer of cyclic diene, a hydrogen additive of cyclic-diene addition polymer, and the like. Among them, a ring-opening polymer, namely a ring-opening polymer of norbornene ring-containing monomer, in particular, is desirable from the standpoints of film formability and resistance to chemical attack.

Such resin materials, namely polycarbonate, polyarylate, polyphenylene ether, cyclic olefin-based resin, and polyetherimide-based resin, can be used alone, or two or more of them can be used in combination. Moreover, a multi-component copolymer may also be used.

A compound as expressed by the general formula (11) may be given as an example of metal alkoxide.

$$B_pM \quad (11)$$

In the general formula (11), B represents an alkoxy group with 1 to 8 carbons, or preferably 1 to 4 carbons, M represents a metal element such as Si, Ti, Zr, Fe, Cu, Sn, Al, Ge, Ta, or W, and p represents an integer of 2 to 6.

Specific examples of metal alkoxide include: tetraalkoxysilanes such as tetramethoxysilane, tetraethoxysilane, tetraisopropoxysilane, and tetrabutoxysilane; tetraalkoxytitaniums such as tetra-n-propoxytitanium, tetraisopropoxytitanium, tetrabutoxytitanium; tetraalkoxyzirconiums such as tetra-n-propoxyzirconium, tetraisopropoxyzirconium, tetrabutoxyzirconium; dimethoxycopper; tributoxyaluminum; tetraethoxygermanium; penta-n-propoxytantalum; and hexaethoxytungsten.

A compound as expressed by the general formula (12) may be given as another example of metal alkoxide.

$$R6_k B_1 M(R7_m Z)_n \tag{12}$$

In the general formula (12), R6 represents hydrogen or an alkyl group or phenyl group with 1 to 12 carbons, or preferably 1 to 5 carbons, B represents an alkoxy group with 1 to 8 carbons, or preferably 1 to 4 carbons, M represents a metal element such as Si, Ti, Zr, Fe, Cu, Sn, Al, Ge, Ta, or W, R7 represents an alkylene group or alkylidene group with 1 to 4 carbons, or preferably 2 to 4 carbons, Z represents a general functional group such as an isocyanate group, an epoxy group, a carboxyl group, an acid halide group, an acid anhydride group, an amino group, a thiol group, a vinyl group, a methacryl group, or a halogen group, k represents an integer of 0 to 5, 1 represents an integer of 1 to 5, m represents 0 or 1, and n represents an integer of 0 to 5.

It is preferable that the organic solvent used for dissolving the resin material of the organic resin and the organic solvent used for dissolving metal alkoxide are identical. As this organic solvent, it is possible to use one containing, for example, methanol, isopropanol, n-butanol, ethylene glycol, ethylene glycol monopropyl ether, methyl ethyl ketone, methyl isobutyl ketone, xylene, propylene glycol monomethyl ether, propylene glycol monomethyl ether acetate, dimethyl acetamide, cyclohexane, toluene, chloroform, tetrahydrofuran, or a mixture of two or more substances selected from among those given above.

For example, the concentration of the resin material in the resin solution (resin concentration) falls in a range of 10% to 40% by mass, or preferably in a range of 20% to 30% by mass. For example, the concentration of metal alkoxide in the metal alkoxide solution (metal alkoxide concentration) falls in a range of 1% to 50% by mass, or preferably in a range of 2% to 30% by mass. Moreover, in mixing the resin solution and the metal alkoxide solution, for example, the ratio of metal alkoxide to 100 parts by mass of the resin material falls in a range of 0.05 part to 10 parts by mass, or preferably in a range of 0.1 part to 6.0 parts by mass.

The size of the metal element-containing fine particle may be adjusted by changing the metal alkoxide concentration of the metal alkoxide solution. As a general rule, as the metal alkoxide concentration is higher, the size of the metal element-containing fine particle to be formed becomes larger. Moreover, the size of the metal element-containing fine particle may be influenced by the reactivity of metal alkoxide. Reactivity of metal alkoxides varies according to types. For example, zirconium (IV) butoxide (Zr-n-but) containing zirconium has relatively low reactivity, and tends to form small metal element-containing fine particles, and, on the other hand, titanium (IV) butoxide (Ti-n-but) containing titanium has relatively high reactivity, and tends to forms large metal element-containing fine particles.

For example, the resin solution and the metal alkoxide solution are mixed (and stirred) at a temperature of 10° C. to 30° C. and at 100 to 500 rpm with use of a stirrer or a mixing rotor. The stirring time is set at 24 to 96 hours. Metal element-containing fine particles of varying sizes can be obtained by making proper adjustments to the temperature and the stirring conditions. These process steps, and more specifically the preparation of the resin solution and the metal alkoxide solution, and the mixing and agitation of these solutions, are each performed in a dry nitrogen atmosphere.

Figure 2A:
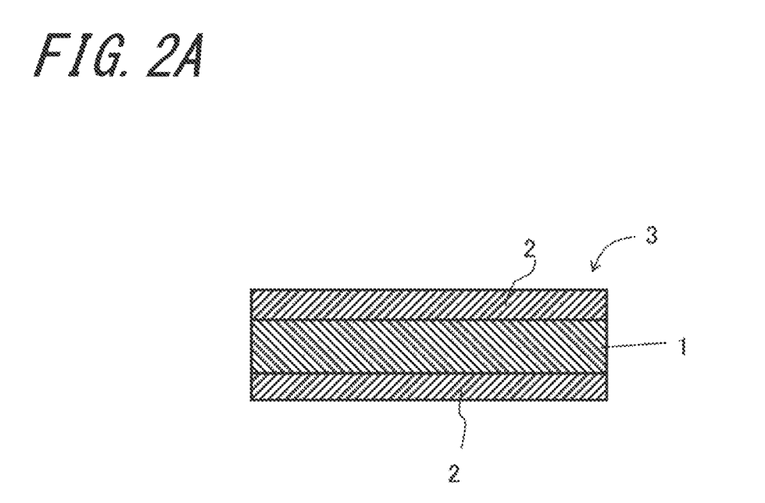
FIG. 2A is a sectional view schematically showing a structure constituted by a dielectric film having a metallic membrane on a surface thereof.
Figure 2B:
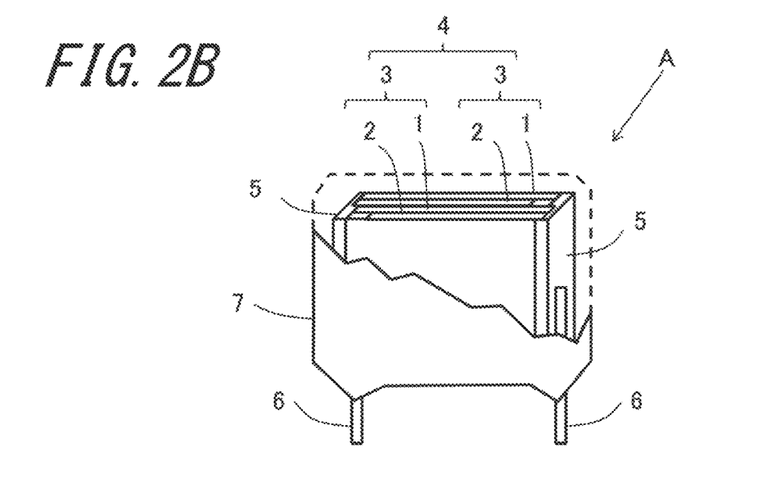
FIG. 2B is an external perspective view showing a film capacitor according to a first embodiment.

FIG. 2A is a sectional view schematically showing a structure constituted by a dielectric film having a metallic membrane on a surface thereof, and FIG. 2B is an external perspective view showing a film capacitor according to a first embodiment. The film capacitor A according to the first embodiment shown in FIG. 2B is basically constructed by attaching an external electrode 5 to a main body 4 composed of a stack of metallized films 3 each comprising a dielectric film 1 with a metallic membrane 2 disposed on one side. A lead wire 6 is disposed in this construction on an as needed basis.

In this case, part of the main body 4, the external electrode 5, and the lead wire 6 may be covered with an exterior member 7 from insulation and environmental resistance standpoints on an as needed basis. FIG. 2B is a view of the construction with part of the exterior member 7 removed, and, the cut-away portion of the exterior member 7 is indicated by dashed lines.

The application of the dielectric film 1 of this embodiment is not limited to a film-stacked capacitor as shown in FIGS. 2A and 2B, and hence the dielectric film 1 may also be applied to a film-wound capacitor B.

Figure 3:
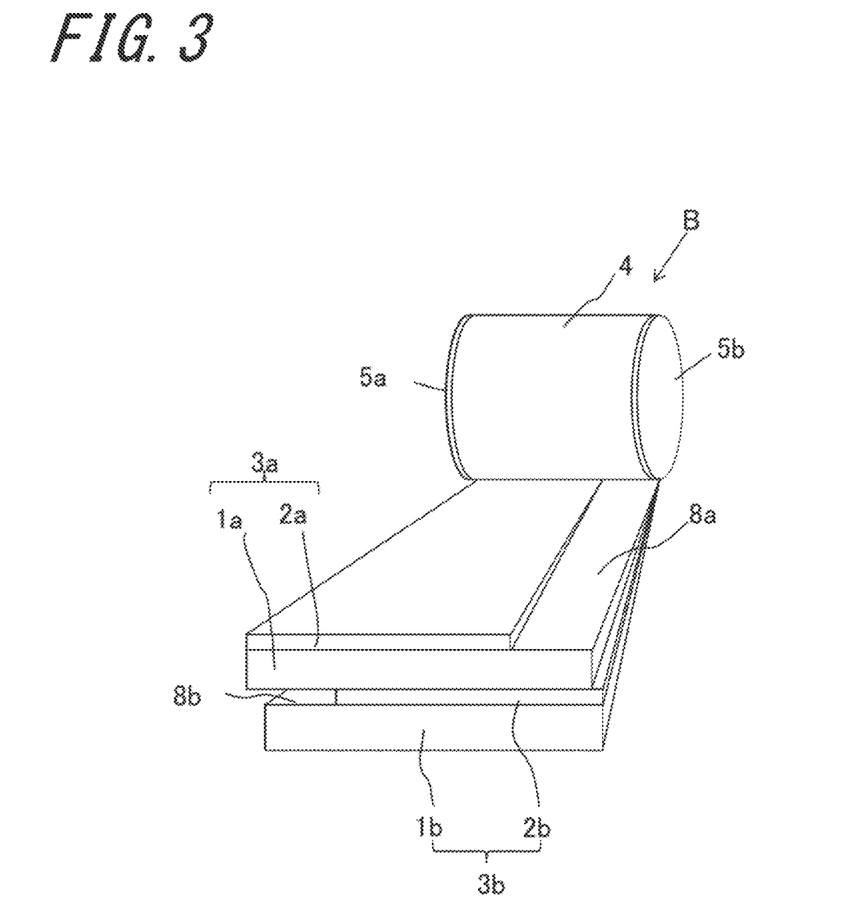
FIG. 3 is a developed perspective view schematically showing the structure of a film capacitor according to a second embodiment.

FIG. 3 is a developed perspective view schematically showing the structure of a film capacitor of the second embodiment. In the film capacitor B of this embodiment, metallized films 3a and 3b are wound to constitute the main body 4, and, Metallikon electrodes are disposed at the opposed end faces, respectively, of the main body 4 as external electrodes 5a and 5b, respectively.

The metallized film 3a comprises a dielectric film 1a having a metallic membrane 2a on a surface thereof, and the metallized film 3b comprises a dielectric film 1b having a metallic membrane 2b on a surface thereof. In FIG. 3, the metallic membrane 2a and 2b are formed on parts of the surface of the dielectric films 1a and 1b located on one ends in the width direction thereof to uncover parts of the dielectric films 1a and 1b, respectively, so that those part are left as longitudinally continuous portions free of the metallic membrane 2a and 2b (hereafter also referred to as "metallic membrane-free portions 8a and 8b"), respectively.

The metallized films 3a and 3b are disposed so that the metallic membrane-free portions 8a and 8b are located on the different ends in the width direction of the dielectric films 1a and 1b, and, the metallized films 3a and 3b are stacked on top of one another in a deviated position so that their ends different from ends corresponding to the metallic membrane-free portions 8a and 8b protrude in the width direction.

That is, the metallized film 3a comprising the dielectric film 1a and the metallic membrane 2a and the metallized film 3b comprising the dielectric film 1b and the metallic membrane 2b are stacked and wound together as shown in FIG. 3 to constitute the film capacitor B. Although, in FIG. 3, the dielectric film 1a, 1b and the metallic membrane 2a, 2b are each illustrated as being shaped so that the thickness becomes larger gradually from the rear to the front as viewed in FIG. 3 in the interest of clarity of illustration of the structure of the film capacitor B, in reality, each component has a uniform thickness.

Figure 4:
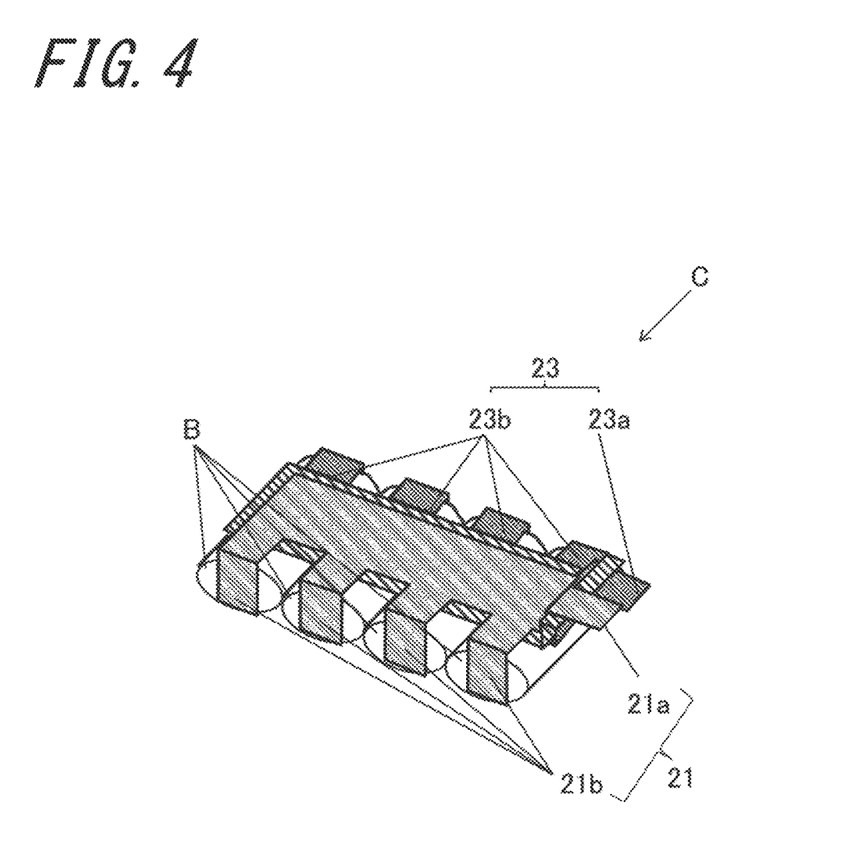
FIG. 4 is a perspective view schematically showing the structure of one embodiment of a combination type capacitor.

FIG. 4 is a perspective view schematically showing the structure of one embodiment of a combination type capacitor. For ease in understanding the structure, the illustration of a case and a resin for molding is omitted from FIG. 4. The combination type capacitor C of this embodiment is constituted by a plurality of the film capacitors B connected in parallel with each other via a pair of bus bars 21 and 23. The bus bars 21 and 23 are composed of terminal portions 21a and 23a and extraction terminal portions 21b and 23b, respectively. The terminal portions 21a and 23a are intended for external connection, and, the extraction terminal portions 21b and 23b are connected to the external electrodes 5a and 5b, respectively, of the film capacitor B.

In contrast to a conventional dielectric film made of, for example, polypropylene or polyethylene terephthalate, the dielectric film 1 of the present embodiment allows thickness reduction, wherefore its use as a dielectric film which constitutes the film capacitor B or the combination type capacitor C makes it possible to reduce the size of the film capacitor B or the combination type capacitor C, as well as to achieve capacity increases.

Moreover, in the case of using an organic material, such as polyarylate, polyphenylene ether, a cyclic olefin-based material, or a polyetherimide-based material, as the organic resin which is a major constituent of the dielectric film 1, the film capacitor B and the combination type capacitor C exhibit high resistance to heat. This makes it possible to obtain a capacitor product which incurs little decrease in capacitance and insulation resistance even when used in high-temperature conditions (for example, in an atmosphere at a temperature of higher than or equal to 80° C.). Even if the combination type capacitor C is alternatively constituted by the film capacitors B stacked so that their flat surfaces are contiguous with each other, it is possible to attain the same effect as achieved in the case for the planar arrangement of the film capacitors B as shown in FIG. 4.

Figure 5:
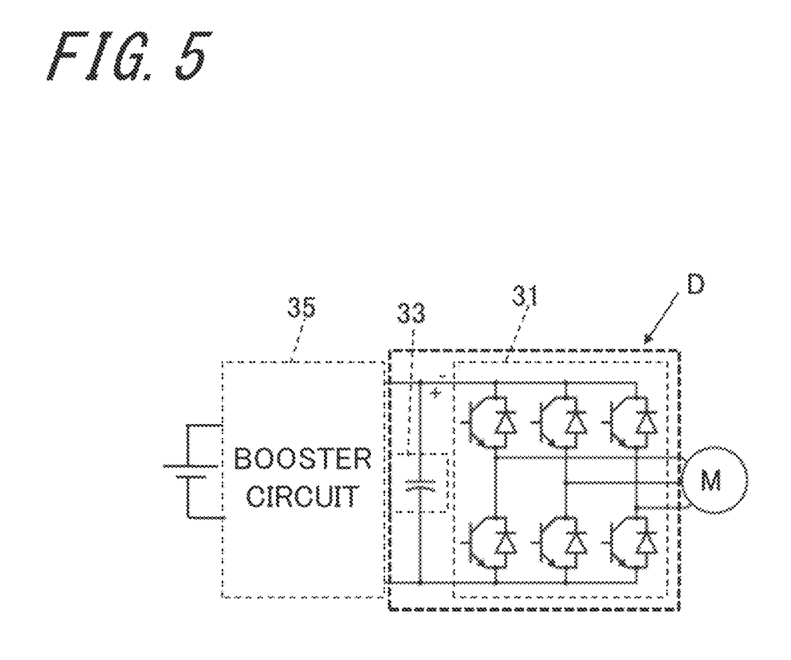
FIG. 5 is a schematic block diagram for explaining the structure of one embodiment of an inverter.

FIG. 5 is a schematic block diagram for explaining the structure of one embodiment of an inverter. In FIG. 5, there is shown an inverter D for producing alternating current from direct current resulting from rectification by way of example. As shown in FIG. 5, the inverter D of this embodiment is composed of a bridge circuit 31 constituted by switching elements (for example, IGBT (Insulated gate Bipolar Transistor)) and a capacitance section 33 placed between the input terminals of the bridge circuit 31 for voltage stabilization. In this construction, the described film capacitor B or combination type capacitor C is applied to the capacitance section 33.

The inverter D is to be connected to a booster circuit 35 for boosting DC power voltage. Meanwhile, the bridge circuit 31 is to be connected to a motor generator (motor M) which serves as a driving source.

The application of the described film capacitor B or combination type capacitor C of the present embodiment to the capacitance section 33 of the inverter D makes it possible to reduce the proportion of the volume of the capacitance section 33 constituting the inverter D, and thereby obtain the inverter D having a more compact yet larger-capacitance capacitance section 33. It is also possible to obtain the inverter D which undergoes little modulation wave fluctuation even in high-temperature conditions.

Figure 6:
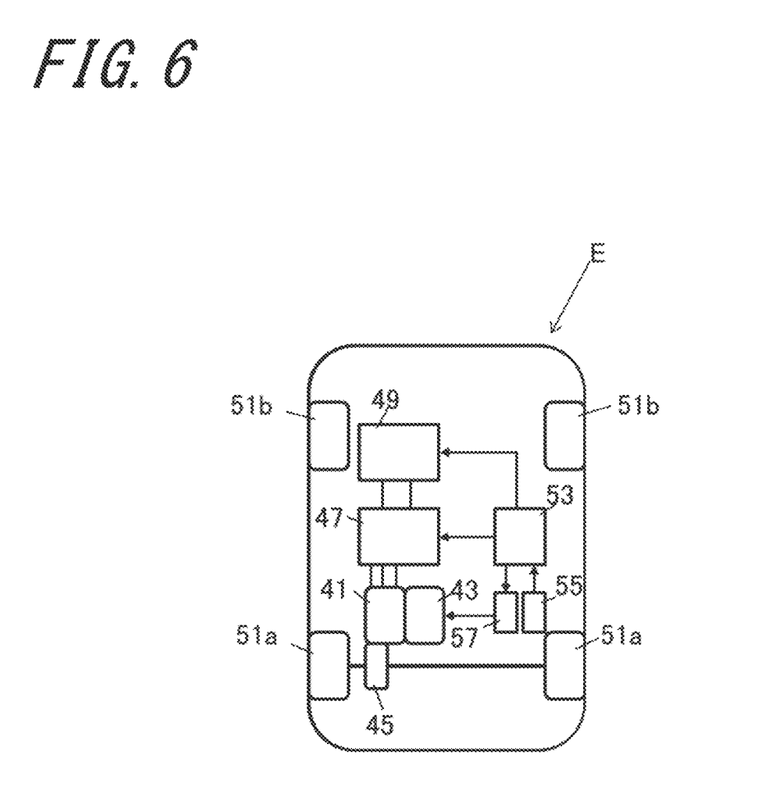
FIG. 6 is a schematic block diagram showing one embodiment of an electric vehicle.

FIG. 6 is a schematic block diagram showing one embodiment of an electric vehicle. In FIG. 6, there is shown a hybrid car (HEV) by way of example of the electric vehicle E.

In FIG. 6, reference numeral 41 denotes a drive motor, reference numeral 43 denotes an engine, reference numeral 45 denotes a transmission, reference numeral 47 denotes an inverter, reference numeral 49 denotes a power supply (battery). reference numerals 51a and 51b denote front wheels and rear wheels, respectively.

In the electric vehicle E, output from the motor 41 or the engine 43, or both of them serving as a driving source is transmitted to a pair of right-hand and left-hand front wheels 51a via the transmission 45. The power supply 49 is connected to the motor 41 via the inverter 47.

Moreover, the electric vehicle E shown in FIG. 6 is provided with a vehicle ECU 53 for exercising multiple unit control over the entire electric vehicle E. The vehicle ECU 53 receives input of a driving signal indicative of the operation of the electric vehicle E, and more specifically, for example, the operation of an ignition key 55, a non-illustrated accelerator pedal, or a non-illustrated brake, by an operator such as a driver. On the basis of the driving signal, the vehicle ECU 53 produces output of a command signal to an engine ECU 57, the power supply 49, and the inverter 47 as a load. The engine ECU 57 controls a number of revolutions of the engine 43 in response to the command signal to drive the electric vehicle E.

In contrast to a large-size inverter incorporating a film capacitor or a combination type capacitor using a conventional dielectric film made of, for example, polypropylene or polyethylene terephthalate, the inverter D of smaller size having the capacitance section 33 using the film capacitor B or combination type capacitor C of the present embodiment allows vehicle weight reduction when mounted in, for example, the electric vehicle E as shown in FIG. 6. Thus, this embodiment achieves vehicle weight reduction which results in improvement in fuel economy. Moreover, the vehicle control unit can be designed to constitute a smaller proportion of the interior of an engine room. The reduction of the proportion of the control unit makes it possible to install a facility for enhancing impact resistance in the interior of the engine room, and thereby achieve further improvement in vehicle safety.

The application of the inverter D of the present embodiment is not limited to the described hybrid car (HEV), and hence the inverter D may also be applicable to various power converter application products, including an electric car (EV), a power-assisted bicycle, a generator, and a solar battery.

EXAMPLES

The following describes the dielectric film pursuant to the invention in detail by way of practical examples.

Example 1

PPE (polyphenylene ether) powder of Xyron (registered trademark) manufactured by Asahi Kasei Corporation and titanium (IV) isopropoxide (Ti-i-Pr), as well as titanium (IV) butoxide (Ti-n-but), were prepared for use as a resin material and metal alkoxide, respectively. Xyron (registered trademark) has been dissolved in chloroform to obtain a solution of resin at a resin concentration of 25% by mass. Each metal alkoxide has been dissolved in chloroform to obtain a solution of metal alkoxide at a metal alkoxide concentration of 5% by mass. The metal alkoxide solution was added to the resin solution so prepared to form a mixed solution. The ratios (part by mass) of metal alkoxide to 100 parts by mass of Xyron (registered trademark) are listed in Table 1. The thereby obtained mixed solution has been stirred by a stirrer at 300 rpm for 24 hours to obtain a solution for dielectric film. Each solution preparation step has been performed in a dry nitrogen atmosphere at room temperature.

Then, dielectric films (Sample Nos. 1 to 4) were produced by applying the dielectric film solution onto a polyethylene terephthalate (PET)-made base by a coater and subsequently performing drying at 180° C. for one hour to remove a solvent. Note that the dielectric film of Sample No. 1 was produced with use of a metal alkoxide-free resin solution. Each dielectric film sample is 3.5 µm in thickness and about 2.6 in relative permittivity.

Example 2

ZEONOR (registered trademark), which is a ring-opening polymer of cyclic olefin-based norbornene, manufactured by ZEON Corporation, and zirconium (IV) butoxide (Zr-n-but), as well as titanium (IV) butoxide (Ti-n-but), were prepared for use as a resin material and metal alkoxide, respectively. ZEONOR (registered trademark) has been dissolved in cyclohexane to obtain a solution of resin at a resin concentration of 25% by mass. Each metal alkoxide has been dissolved in cyclohexane to obtain a solution of metal alkoxide at a metal alkoxide concentration of 5% by mass. The metal alkoxide solution was added to the resin solution so prepared to form a mixed solution. At this time, the preparation has been made so that the ratio of metal alkoxide to 100 parts by mass of ZEONOR (registered trademark) stands at 1 part by mass. The mixed solution has been stirred by a stirrer at 300 rpm for 24 hours to obtain a solution for dielectric film. Each solution preparation step has been performed in a dry nitrogen atmosphere at room temperature.

Then, dielectric films (Sample Nos. 5 to 7) were produced by applying the dielectric film solution onto a polyethylene terephthalate (PET)-made base by a coater and subsequently performing drying at 180° C. for one hour to remove a solvent. Note that the dielectric film of Sample No. 5 was produced with use of a metal alkoxide-free resin solution. Each dielectric film sample is 3.5 µm in thickness and about 2.3 in relative permittivity.

Example 3

Siloxane-modified polyetherimide (STM 1700 manufactured by SABIC), and zirconium (IV) butoxide (Zr-n-but), as well as titanium (IV) butoxide (Ti-n-but), were prepared for use as a resin material and metal alkoxide, respectively. STM 1700 has been dissolved in chloroform to obtain a solution of resin at a resin concentration of 25% by mass. Each metal alkoxide has been dissolved in chloroform to obtain a solution of metal alkoxide at a metal alkoxide concentration of 5% by mass. The metal alkoxide solution was added to the resin solution so prepared to form a mixed solution. At this time, the preparation has been made so that the ratio of metal alkoxide to 100 parts by mass of STM 1700 stands at 1 part by mass. The mixed solution has been stirred by a stirrer at 300 rpm for 24 hours to obtain a solution for dielectric film. Each solution preparation step has been performed in a dry nitrogen atmosphere at room temperature.

Then, dielectric films (Sample Nos. 8 to 10) were produced by applying the dielectric film solution onto a polyethylene terephthalate (PET)-made base by a coater and subsequently performing drying at 180° C. for one hour to remove a solvent. Note that the dielectric film of Sample No. 8 was produced with use of a metal alkoxide-free resin solution. Each dielectric film sample is 3.5 µm in thickness and about 3.0 in relative permittivity.

Example 4

Polyarylate resin having polyester as main backbone as described in the paragraph of Production Example 1 in Japanese Unexamined Patent Publication JP-A 2013-76042 was used as a resin material. As metal alkoxide, zirconium (IV) butoxide (Zr-n-but), acetoalkoxyaluminum diisopropylate (Al-M), and titanium (IV) butoxide (Ti-n-but) were used.

The prepared polyarylate resin has been heated in a vacuum at 120° C. for 3 hours to remove moisture adsorbed onto the polyarylate resin. The polyarylate resin so obtained has been dissolved in toluene to obtain a solution of resin at a resin concentration of 25% by mass. Moreover, each metal alkoxide has been dissolved in toluene to obtain a solution of metal alkoxide at a metal alkoxide concentration of 5% by mass, and also a 50% solution, by mass, of Zr-n-but. Each metal alkoxide solution was added to the resin solution so prepared to form a mixed solution. The amount of each metal alkoxide solution to be added was so adjusted that the ratio (part by mass) of metal alkoxide to 100 parts by mass of polyarylate stands at a value as listed in Table 2. The thereby obtained mixed solution has been stirred by a stirrer at 300 rpm for 24 hours to obtain a solution for dielectric film. Each solution preparation step has been performed in a dry nitrogen atmosphere at room temperature.

Then, dielectric films (Sample Nos. 11 to 24) were produced by applying the dielectric film solution onto a polyethylene terephthalate (PET)-made base by a coater and subsequently performing drying at 180° C. for one hour to remove a solvent. Note that the dielectric film of Sample No. 11 was produced with use of a metal alkoxide-free resin solution, and, the dielectric film of Sample No. 18 was produced with use of a 50% solution, by mass, of Zr-n-but. Each of the obtained dielectric film samples is 3.5 µm in thickness and about 3.2 in relative permittivity.

$^1$H-NMR (Proton NMR) spectrometry has been performed on each dielectric film so produced. In the resultant $^1$H-NMR spectrum, other peak than a polyarylate-derived peak has been observed, and, the results of HMQC spectrometry and HMBC spectrometry based on two-dimensional correlation NMR spectroscopy showed that this peak resulted from hydrogen bound to a carbon atom contiguous to an oxygen atom of each alkoxy group, expressed differently, an alkoxy group was bound directly to the main backbone of the organic resin by ester linkages without intermediary of a metal element. There was no sign of any peak derived from unreacted metal alkoxide. Moreover, the ratio of the alkoxy group to all the ester linkages present in each dielectric film has been determined by calculation on the basis of the resultant $^1$H-NMR spectrum. The calculation results are listed in Table 2.

(Characteristics Evaluation)

The type and content of a metal element contained in each dielectric film have been determined by ICP emission spectrometry. The metal element contained in the dielectric film was found to be identical with the metal element constituting metal alkoxide added to the organic resin. The result of observation of the section of the dielectric film using a transmission electron microscope (TEM) (JEM-ARM 200F, HAADF image, accelerating voltage: 200 kV) of a magnification of 3,000,000 times showed that each of the dielectric films of Sample Nos. 2 to 4, No. 6, No. 7, No. 9, No. 10, and Nos. 12 to bears fine particles containing the metal element (metal element-containing fine particles) therein. The average of the diameters of the metal element-containing fine particles and the volume percentage of the metal element-containing fine particles have been determined by analyzing profile data obtained by measurement using Small Angle X-ray Scattering Method. The metal element content, the average of the diameters of the metal element-containing fine particles, and the volume percentage of the metal element-containing fine particles are listed in Tables 1 and 2.

Breakdown field measurement was made on the dielectric film in the following manner. After removing the PET film from the dielectric film, an Al electrode layer having an average thickness of 75 nm was formed on each side of the dielectric film by vacuum deposition to produce a metallized film.

The breakdown field level of the thereby obtained metallized film was measured. DC voltage has been applied between the metallic membranes of the metallized film at a voltage raising rate of 10 V/sec. The breakdown field level has been determined on the basis of the voltage value obtained at the instant at which the value of leakage current exceeded 1.0 mA. The breakdown field level of each metallized film is listed in Tables 1 and 2.

TABLE 1

| | | Dielectric film | | | | | |
|---|---|---|---|---|---|---|---|
| | | Metal alkoxide | | Content of | Metal element-containing fine particles | | |
| Sample No. | Organic resin[*1] | Type | Ratio[*2] Part by mass | metal element % by mass | Mean diameter nm | Volume percentage % by volume | Breakdown field V/μm |
| 1 | PPE | — | — | — | — | — | 500 |
| 2 | PPE | Titanium (IV) isopropoxide | 0.5 | 0.12 | 2 | 6 | 520 |
| 3 | PPE | Titanium (IV) isopropoxide | 1 | 0.24 | 2 | 6 | 530 |
| 4 | PPE | Titanium (IV) butoxide | 1 | 0.24 | 2 | 6 | 530 |
| 5 | COP | — | — | — | — | — | 650 |
| 6 | COP | Zirconium (IV) butoxide | 1 | 0.24 | 1 | 6 | 680 |
| 7 | COP | Titanium (IV) butoxide | 1 | 0.24 | 3 | 12 | 700 |
| 8 | PEI | — | — | — | — | — | 500 |
| 9 | PEI | Zirconium (IV) butoxide | 1 | 0.24 | 1 | 6 | 520 |
| 10 | PEI | Titanium (IV) butoxide | 1 | 0.24 | 3 | 12 | 510 |

[*1]PPE: Xyron manufactured by Asahi Kasei Corporation (PPE Powder); COP: ZEONOR manufactured by ZEON Corporation; PEI: STM 1700 manufactured by SABIC
[*2]Ratio of metal alkoxide to 100 parts by mass of organic resin

TABLE 2

| | | | | | Dielectric film | | | |
|---|---|---|---|---|---|---|---|---|
| | Metal alkoxide 1 | | Metal alkoxide 2 | | Alkoxy group/ester linkage ratio % | Content of metal element % by mass | Metal element-containing fine particles | | Breakdown field V/μm |
| Sample No. | Type (Alkoxy group) | Ratio[*2] Part by mass | Type (Alkoxy group) | Ratio[*2] Part by mass | | | Mean diameter nm | Volume percentage % by volume | |
| 11 | None | — | None | — | — | — | — | — | 420 |
| 12 | Zirconium (IV) butoxide (—OC$_4$H$_9$) | 0.05 | None | — | 0.06 | 0.01 | 1 | 0.3 | 430 |
| 13 | | 0.5 | | | 0.6 | 0.12 | 1 | 3 | 460 |
| 14 | | 1 | | | 1.1 | 0.24 | 1 | 6 | 470 |
| 15 | | 2 | | | 2.2 | 0.48 | 1 | 12 | 480 |
| 16 | | 3 | | | 3.3 | 0.71 | 1 | 18 | 480 |
| 17 | | 10 | | | 1.1 | 2.38 | 1 | 30 | 430 |
| 18 | | 1 | | | 1.1 | 0.24 | 50 | 6 | 430 |
| 19 | | 0.5 | Acetoalkoxyaluminum diisopropylate (—OC$_{18}$H$_{35}$) | 2 | 2.2 | 0.23 | 2 | 8 | 490 |
| 20 | | 1 | | 2 | 2.8 | 0.35 | 2 | 10 | 490 |
| 21 | Acetoalkoxyaluminum | 1 | None | — | 0.9 | 0.05 | 0.5 | 2 | 440 |

TABLE 2-continued

| | Metal alkoxide 1 | | Metal alkoxide 2 | | Dielectric film | | | | |
|---|---|---|---|---|---|---|---|---|---|
| | | | | | Alkoxy | | Metal element-containing fine particles | | |
| Sample No. | Type (Alkoxy group) | Ratio*2 Part by mass | Type (Alkoxy group) | Ratio*2 Part by mass | group/ester linkage ratio % | Content of metal element % by mass | Mean diameter nm | Volume percentage % by volume | Breakdown field V/μm |
| 22 | diisopropylate (—OC$_{18}$H$_{35}$) | 3 | | | 2.5 | 0.16 | 0.5 | 4 | 460 |
| 23 | Titanium (IV) butoxide | 1 | | | 1.2 | 0.14 | 1.2 | 5 | 470 |
| 24 | (—OC$_4$H$_9$) | 3 | | | 3.7 | 0.42 | 1.2 | 15 | 480 |

*2Ratio of metal alkoxide to 100 parts by mass of organic resin

In Sample Nos. 2 to 4, No. 6, No. 7, No. 9, No. 10, and Nos. 12 to 24, metal element-containing fine particles are included in the organic resin, and, the average of the diameters of the metal element-containing fine particles falls in a range of 0.5 nm to 50 nm. Thus, these samples were found to have a high level of breakdown field and excellent insulation properties. Moreover, in Sample Nos. 12 to 24, an alkoxy group was bound directly to the main backbone of the organic resin by ester linkages without intermediary of the metal element. As a consequence, the rate of improvement in breakdown field in each of Sample Nos. 12 to 24 is higher than that in other sample free of the direct binding of an alkoxy group to the main backbone.

Moreover, 1.5 μm-thick dielectric films were produced from the dielectric film solutions used for Sample Nos. 3, 6, 9, and 14, respectively, and, breakdown field measurement was made on each of them. As a result, the breakdown field levels of the 1.5 μm-thick dielectric films stand at 480 V/μm (Sample No. 3), 620 V/μm (Sample No. 6), 470 V/μm (Sample No. 9), and 430 V/μm (Sample No. 14). That is, each 1.5 μm-thick dielectric film has succeeded in maintaining a breakdown field level which is as high as about 90% of that of the corresponding 3.5 μm-thick dielectric film.

REFERENCE SIGNS LIST

A, B: Film capacitor
C: Combination type capacitor
D, 47: Inverter
E: Electric vehicle
1, 1a, 1b: Dielectric film
2, 2a, 2b: Metallic membrane
3, 3a, 3b: Metallized film
4: Main body
5, 5a, 5b: External electrode
6: Lead wire
7: Exterior member
8a, 8b: Metallic membrane-free portion
21, 23: Bus bar
31: Bridge circuit
33: Capacitance section
35: Booster circuit
41: Motor
43: Engine
45: Transmission
47: Inverter
49: Power supply
51a: Front wheel
51b: Rear wheel
53: Vehicle ECU
55: Ignition key
57: Engine ECU

The invention claimed is:

1. A dielectric film, comprising:
an organic resin containing a resin material having polyester as a main backbone, the resin material having an alkoxy group with 3 or more carbons, the alkoxy group and the main backbone of polyester of the resin material being bound by ester linkages, the resin material having polyester as the main backbone is polyarylate; and
a plurality of fine particles containing a metal element,
an average of diameters of the fine particles falling in a range of 1 nm to 3 nm,
wherein the polyarylate has a structure of Formula 1 or Formula 2, Formula 1

Formula 2 wherein a Y group in Formula 2 is either a substituted arylene group or an unsubstituted arylene group,
wherein an X group in both Formula 1 and Formula 2 is a divalent group expressed by Formula 3:

Formula 3 wherein in a R1 group is selected from one of a substituted alkyl group, an unsubstituted alkyl group, an aryl group and a halogen atom,
wherein in a R2 group is selected from one of a substituted alkyl group, an unsubstituted alkyl group, an aryl group and a halogen atom, wherein A represents one of a single bond, a 1-12C straight-chain, a branched alkylene group and a cyclic alkylene group, and wherein the metal element is at least one element selected from a metal element group consisting of Sn, W and Fe.

2. The dielectric film according to claim 1,
wherein a content of the metal element falls in a range of 0.05% to 5% by mass.

3. The dielectric film according to claim 1,
wherein a volume percentage of the fine particles falls in a range of 0.4% to 40% by volume.

4. The dielectric film according to any one of claim 1,
wherein the metal element further includes at least one element selected from a metal element group consisting of Si, Ti, Zr, and Al.

5. The dielectric film according to claim 1,
wherein the organic resin contains at least one material selected from a resin material group consisting of polyphenylene ether, a cyclic olefin-based material, and a polyetherimide-based material.

6. The dielectric film according to claim 1,
wherein a ratio by mole of the alkoxy group to all the ester linkages present in the organic resin falls in a range of 0.05% to 11%.

7. A film capacitor, comprising:
a main body composed of a roll or laminate of metallized films each comprising the dielectric film according to claim 1 and a metallic membrane disposed thereon; and
an external electrode disposed on the main body.

8. A combination type capacitor, comprising:
bus bars; and
a plurality of the film capacitors according to claim 7 connected to each other via the bus bars.

9. An inverter, comprising:
a bridge circuit constituted by switching elements; and
a capacitance section connected to the bridge circuit, the capacitance section being the film capacitor according to claim 7.

10. An inverter, comprising:
a bridge circuit constituted by switching elements; and
a capacitance section connected to the bridge circuit,
the capacitance section being the combination type capacitor according to claim 8.

11. An electric vehicle, comprising:
a power supply;
an inverter connected to the power supply;
a motor connected to the inverter; and
wheels driven by the motor,
the inverter being the inverter according to claim 9.

12. An electric vehicle, comprising:
a power supply;
an inverter connected to the power supply;
a motor connected to the inverter; and
wheels driven by the motor,
the inverter being the inverter according to claim 10.

* * * * *